(12) United States Patent
Gustafsson

(10) Patent No.: US 7,644,163 B2
(45) Date of Patent: Jan. 5, 2010

(54) PLUG AND PLAY MOBILE SERVICES

(75) Inventor: Patrik Gustafsson, Espoo (FI)

(73) Assignee: Nokia Corporation, Espoo (FI)

( * ) Notice: Subject to any disclaimer, the term of this patent is extended or adjusted under 35 U.S.C. 154(b) by 233 days.

(21) Appl. No.: 10/757,560

(22) Filed: Jan. 13, 2004

(65) Prior Publication Data

US 2005/0153683 A1 Jul. 14, 2005

(51) Int. Cl.
G06F 15/16 (2006.01)
H04M 3/00 (2006.01)
H04W 36/00 (2009.01)
H04B 1/08 (2006.01)
H04L 9/32 (2006.01)
H04B 7/212 (2006.01)

(52) U.S. Cl. .............. 709/227; 709/203; 455/418; 455/436; 455/347; 713/176; 370/337

(58) Field of Classification Search ................ 455/418, 455/436, 411, 347; 370/401, 348, 337; 713/176; 717/171; 709/227, 203
See application file for complete search history.

(56) References Cited

U.S. PATENT DOCUMENTS

| | | | |
|---|---|---|---|
| 6,658,011 B1 * | 12/2003 | Sevanto et al. ............ | 370/401 |
| 6,930,994 B1 * | 8/2005 | Stubbs .................... | 370/348 |
| 7,039,714 B1 * | 5/2006 | Blakley, III et al. ........ | 709/229 |
| 2002/0116268 A1 * | 8/2002 | Fukuda .................. | 705/14 |
| 2003/0023849 A1 * | 1/2003 | Martin et al. ............ | 713/176 |
| 2003/0114158 A1 * | 6/2003 | Soderbacka et al. ....... | 455/436 |
| 2004/0093595 A1 * | 5/2004 | Bilange .................. | 717/171 |
| 2004/0137890 A1 * | 7/2004 | Kalke .................... | 455/418 |
| 2006/0155803 A1 * | 7/2006 | Muramatsu et al. ........ | 709/203 |

FOREIGN PATENT DOCUMENTS

WO    WO 02/44867 A2    6/2002

\* cited by examiner

*Primary Examiner*—Philip C Lee

(57) ABSTRACT

This invention describes "plug and play" methodology for configuring a terminal, enabled for handling data-protocol services (e.g. GRPS), for the data-protocol services specific to a service provider so as to be able to connect said terminal to an IP backbone network via a network, which provides said data-protocol services and which is provided by said service provider. The invention further consists of using a well-known access point node (APN) name, and a well-known uniform resource locator (URL) string to access a service provider specific help-portal server of the network to request information for configuring the terminal. A core part of the invention is the fact that the security of the download is ensured by means of a chain of trust that originates with a trusted home location register or the well-known APN name, and is built using a trusted APN, the well-known URL string and a trusted domain name service.

35 Claims, 4 Drawing Sheets

PLUG AND PLAY MOBILE SERVICES

FIELD OF THE INVENTION

This invention generally relates to cellular communication systems and networks and more specifically to configuring in a secure way a terminal for data-protocol services (e.g. GPRS) specific to a service provider to be able to connect said terminal to an IP backbone network via a network, which provides said data-protocol services and which is provided by said service provider.

BACKGROUND OF THE INVENTION

1. Field of Technology and Background

The mobile phone (equivalently called user equipment, UE, mobile station, MS, phone or terminal) uses general packet radio service (GPRS) network to access an IP network that provides services (e.g. Internet). The only configuration needed to get GPRS access to this IP network is an access point node (APN).

APN used by the client to request a GPRS network access point is a logical handle. It is mapped to a physical access point by a home location register (HLR)/visitor location register (VLR) and a serving GPRS support node (SGSN).

The GPRS phone connects to a gateway GPRS support node (GGSN) of GPSN (i.e. APN) and during creation of a packet data protocol (PDP) context the GGSN provides the client with both an IP address as well as a domain name system (DNS) server. This allows the phone to start browsing immediately.

A wildcard APN is supported by both 2G and 3G SGSN. If no information is provided by a terminal, the SGSN uses the default received from the HLR for a specific PDP address type. The APN may be a wildcard, but it is unclear if all networks support this mechanism. According to specifications the client may request the wildcard (unspecified) APN, but in real world deployments the wildcard APN is often not supported.

However, after the completion of this basic process the phone has a very limited configuration and limited capabilities. It does not know anything about any e-mail servers, or a multimedia messaging service (MMS), or usage preferences, or preferred APN, or different services, etc. Thus it needs to somehow load more information to the phone when it connects for the first time, so it does not need to load said information again for the subsequent connections.

It is possible to configure the initial GGSN so that it only gives access to a very limited set of IP addresses (an Administration and Configuration domain), i.e. those that are relevant to the initialization service it desires to set up.

The GGSN provides the DNS server address in the parameter "protocol configuration options" (within the GPRS tunneling protocol, GTP). However, the GGSN currently is not able to provide any other parameters than the IP address and DNS server.

2. Problem Formulation and Prior Art

The problem is to adapt by means of configuration a generic device (a GPRS or a 3G phone) to a service provider (network operator) specific environment in a secure way without pre-defined service provider specific settings. Currently the methods used are service provider specific factory pre-configuration, settings loading by means of a memory card, and Over-The-Air (OTA) provisioning messages (for example, by means of an Open Mobile Alliance (OMA) client provisioning). The problems associated with existing methods are weak personalization, lack of interactive functionality, heavy logistics and inflexibility, lacking reliability, etc.

It is possible to perform provisioning using short message service (SMS) messages. It is possible to enhance the security of these provisioning messages by means of PIN codes, or secrets in the phone. It is also possible to utilize a public key infrastructure (PKI) and signing to enhance security. However, using the default characteristics of a GPRS network, and the chain of trust that can be derived from this environment is not addressed by the prior art.

SUMMARY OF THE INVENTION

The object of the present invention is to provide a "plug & play" methodology of configuring a terminal in a secure way, enabled for handling data-protocol services (e.g. GRPS), for the data-protocol services specific to a service provider to be able to connect said terminal to an IP backbone network via a network, which provides said data-protocol services (e.g. GRPS) and which is provided by said service provider, according to the present invention, wherein the security of said configuration of said data-protocol services is ensured by means of a chain of trust.

According to a first aspect of the invention, a method, by which a terminal, enabled for handling data-protocol services, is dynamically configured for the data-protocol services specific to a service provider in a secure way based on a chain of trust so as to be able to connect said terminal to an IP backbone network via a network, which provides said data-protocol services and which is provided by said service provider, comprising the steps of: sending an access-request signal to the network by the terminal for connecting to a help-portal server of said network and for requesting a provisioning signal or a management session signal for configuring the terminal; and forwarding the access-request signal to the help-portal server by the terminal using a well-known uniform resource locator (URL) and a trusted access point node in order to provide the provisioning signal or the management session signal to the terminal.

According further to the first aspect of the invention, the data-protocol services specific to said service provider may be provided by a general packet radio service.

Further according to the first aspect of the invention, the access-request signal may be sent by a browser user agent block of the terminal.

Still further according to the first aspect of the invention, the well-known uniform resource locator (URL) is allowed by an access control profile of the terminal.

According further to the first aspect of the invention, the method may further comprise the step of sending the provisioning signal or the management session signal to the terminal for configuring the terminal. Further, the provisioning signal or the further provisioning signal may be sent over an IP bearer or may be sent using a short message service (SMS) protocol. Still further, said provisioning signal may be sent over the IP bearer using a hyper text transfer protocol (HTTP) or a hyper text transfer protocol secure (HTTPS). Yet still further, said provisioning signal may be sent over the air (OTA).

According still further to the first aspect of the invention, after the step of sending the access-request signal, the method may further comprise the steps of: identifying to the terminal the trusted access point node name by a trusted home location register (HLR) of the network; forwarding the access-request signal to the trusted access point node by the terminal; identifying to the terminal a trusted domain name service server of the network by the trusted access point node; forwarding said access-request signal to the trusted domain name service (DNS) server by the terminal; forwarding said access-request signal by the terminal to the trusted domain name service (DNS) server for identifying an address mapping for the help-portal server; and identifying said address mapping to the terminal by the trusted domain name service server. Still further, a security of configuring the terminal is ensured by means of the chain of trust built by the trusted home location register, by the well-known access point node name for accessing the trusted access point node, by the trusted access point node, by the trusted domain name service server and by the well-known uniform resource locator.

According further still to the first aspect of the invention, after the step of forwarding the access-request signal to the help-portal server, the method may further comprise the steps of: sending user authentication request signals to an authentication block of the network or to the terminal or to both, the authentication block and the terminal, respectively, by the help-portal server, and receiving authentication confirmation signals back from the authentication block or from the terminal, respectively, or from both, the authentication block and the terminal; and determining if the terminal is authentic by the help-portal server based on the authentication confirmation signals. Further, said access-request signal may contain user identification information, a generic uniform resource locator (URL) request for the help-portal server, and a well-known access point node (APN) name for accessing the trusted access point node or a wildcard access point node (APN). Still further, if it is determined that the terminal is authentic, the method may further comprise the steps of: sending a triggering signal to a provisioning server by the help-portal server; and sending a provisioning signal by the provisioning server to the terminal and so configuring said terminal.

According yet further still to the first aspect of the invention, said access-request signal may contain user identification information, a generic uniform resource locator (URL) request for the help-portal server and for a device management server, a well-known access point node name for accessing the trusted access point node or a wildcard access point node (APN). Further, if it is determined that the terminal is authentic, the method may further comprise the steps of: sending an initial provisioning triggering signal to a device management server for initial provisioning; and sending a further triggering signal by the help-portal server to an initialization content handler of the terminal, said further triggering signal containing a proxy address and a password for connecting to the device management server. Still further, the method may further comprise the step of determining if the further triggering signal contains an instruction of making a connection to the device management server by the terminal. Yet still further, if the further triggering signal contains the instruction for making the connection to the device management server by the terminal, the method further comprises the steps of: sending a start signal to a device management agent block of the terminal by the initialization content handler block; sending a further access-request signal containing a network access authentication to the device development server by the device management agent block; and sending the management session signal by the device development server to the terminal for further configuring the terminal.

Yet still further according to the first aspect of the invention, before the step of sending the access-request signal to the network, the method further comprises the step of starting the browser user agent by a starting signal from the user.

According to a second aspect of the invention, a cellular communication system comprises: a terminal, enabled for handling data-protocol services and dynamically configured for the data-protocol services specific to a service provider in a secure way based on a chain of trust, responsive to a provisioning signal or to a management session signal for configuring the terminal, for providing an access-request signal; and a network provided by said service provider, responsive to the access-request signal, for providing the data-protocol services specific to a service provider, for forwarding the access-request signal to a help-portal server using a well-known uniform resource locator (URL) and a well-known access point node name, for providing the provisioning signal or the management session signal to the terminal to perform said configuring and for enabling after said configuring a connection of said terminal to an IP backbone network via the network.

According further to the second aspect of the invention, the well-known uniform resource locator (URL) is allowed by an access control profile of the terminal.

Further according to the second aspect of the invention, the data-protocol services specific to said service provider are provided by a general packet radio service.

Still further according to the second aspect of the invention, the terminal may comprise a browser user agent block, responsive to a starting signal from a user, for providing the access-request signal to the network.

According further to the second aspect of the invention, the network may comprise: a help-portal server, responsive to the access-request signal and to one or both authentication confirmation signals, for providing a triggering signal, or an initial provisioning triggering signal and a further triggering signal; a trusted domain name service (DNS) server, responsive to the access-request signal from the terminal, for identifying to the terminal an address mapping for the help-portal server; a trusted access point node, responsive to the access-request signal, for providing to the terminal the trusted domain name service (DNS) server; a home location register, responsive to the access-request signal, for providing the trusted access point node to the terminal; and optionally an authentication block, responsive to an authentication request signal, for providing the authentication confirmation signal to the help-portal server. Further still, a security of configuring the terminal is ensured by means of the chain of trust built by the trusted home location register, by the well-known access point node name for accessing the trusted access point node, and further built by the trusted access point node, by the trusted domain name service server and by the well-known uniform resource locator.

According still further to the second aspect of the invention, the access-request signal may contain user identification information, a generic uniform resource locator (URL) request for the help-portal server, and a well-known access point node (APN) name for accessing the trusted access point node or a wildcard access point node (APN). Yet still further, the terminal may further comprise: a provisioning server, responsive to the triggering signal by the help-portal server, for providing the provisioning signal to the terminal.

According further still to the second aspect of the invention, said access-request signal may contain user identification information, a generic uniform resource locator (URL) request for the help-portal server and for a device management server, a well-known access point node name for accessing the trusted access point node or a wildcard access point node (APN). Still further, the network may further comprise: a device management server, responsive to the access-request signal and to a further access-request signal containing a network access authentication, for providing the management session signal to the terminal for configuring the terminal. Yet further, the terminal may further comprise: an initialization content handler, responsive to the further triggering signal containing a proxy address and a password for connecting to the device management server, for providing a start signal; and a device management agent block, responsive to the start signal, for providing the further access-request signal.

Yet still further according to the second aspect of the invention, the provisioning signal may be sent over an IP bearer or sent using a short message service (SMS) protocol. Further, said provisioning signal may be sent over the IP bearer using a hyper text transfer protocol (HTTP) or a hyper text transfer protocol secure (HTTPS). Still further, said provisioning signal may be sent over the air (OTA).

According to a third aspect of the invention, a computer program product comprises: a computer readable storage structure embodying computer program code thereon for execution by a computer processor with said computer program code characterized in that it includes instructions for performing the steps of the method of claim 1 indicated as being performed by a terminal or by a network or by both the terminal and the network.

Benefits of the present invention include but are not limited to the following:

- The present invention decouples phone logistics from service provider specific service environments.
- The present invention allows to produce, e.g., a generic GPRS enabled phone with a small and common set of factory configured parameters (for example two parameters), and these phones can be distributed all over the world and will always be able to load the data service configuration of the service provider who provides the service to the user.
- The present invention makes it very easy for the end user to activate Data Services, in addition to downloading functional service configurations and software objects.
- The present invention moves the focus of Data Services rollout from settings management to Data Service Management. It allows the industry to copy the success of short message service (SMS) messaging to the data space.
- The present invention leverages existing infrastructure and does not require service providers to deploy any new technology (only to combine already deployed technology in a way described in the invention).
- By configuring the activation and configuration domain (A&C domain) to quickly drop inactive packet data protocol (PDP) contexts, the infrastructure cost can be minimized. Free PDP contexts are mainly used to deliver multimedia messaging service (MMS) messages that have been paid by the sender.
- The service provider gets an on-line opportunity to market data services and GPRS, and to sign the end user to a GPRS subscription, which will generate at least per-byte revenue, and potentially also monthly subscription revenue.
- The service provider can use the "A&C domain" concept to sell ringing tones and screen savers to the end user.
- The concept can be deployed with very low costs.
- First phase deployment by configuring existing infrastructure, and leveraging existing phones (e.g., both WAP 1.x and XHTML phones).
- Configuration of phones done by the OTA provisioning in the first phase with the device management in the second phase for enhancing the concept.
- The present invention allows deployment of business models where
  - All end users have limited GPRS in order to access services within the A&C domain;
  - The service provider can use the "A&C domain" to boost the MMS.
- MMS-receive functionality is provided for all users: this dramatically increases the probability of a successful MMS transaction. The service provider also gets revenue from each successful MMS sent and received transaction.

BRIEF DESCRIPTION OF THE DRAWINGS

For a better understanding of the nature and objects of the present invention, reference is made to the following detailed description taken in conjunction with the following drawings, in which.

DISCLOSURE OF INVENTION AND BEST MODE FOR CARRYING OUT THE INVENTION

Figure 1:
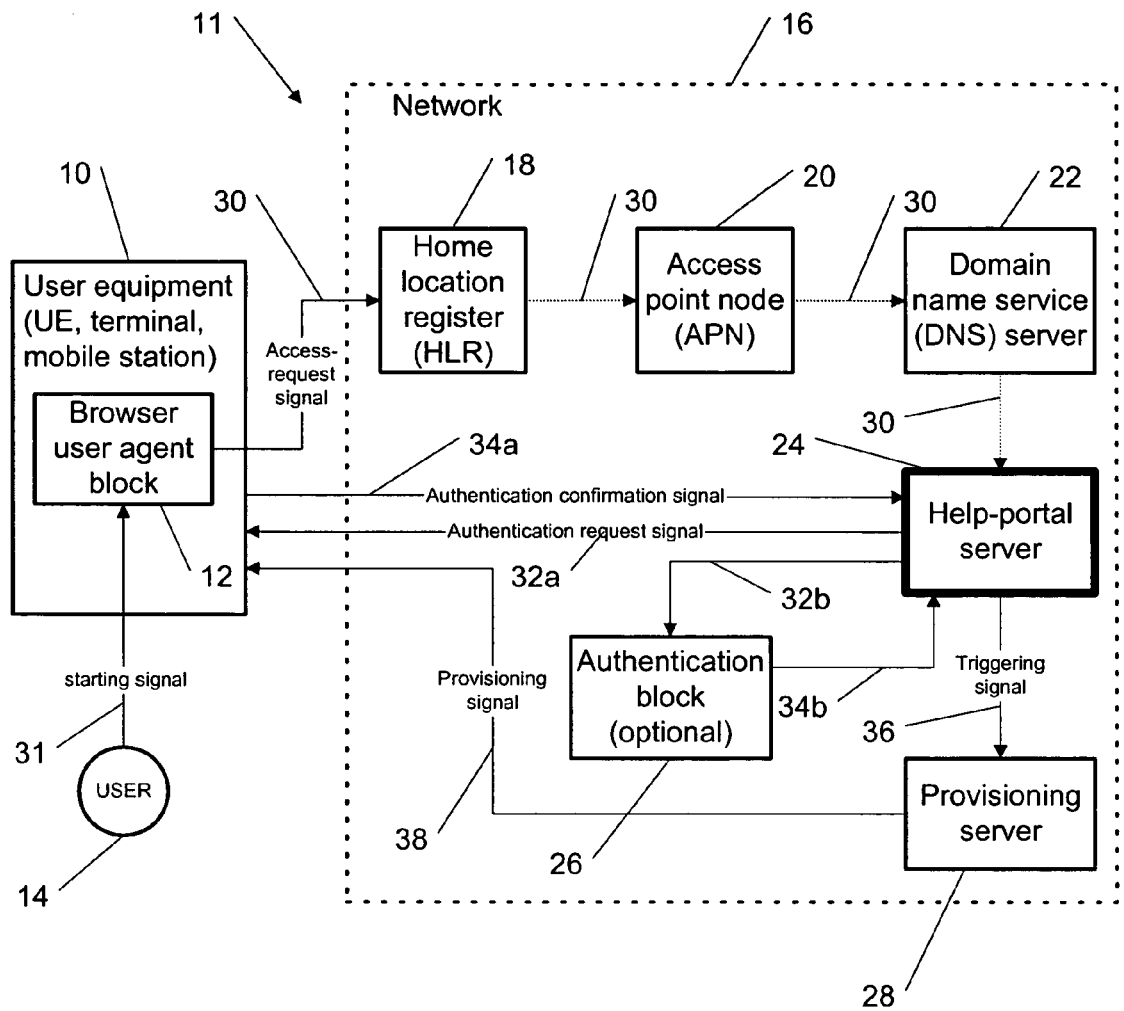
FIG. 1 is a block diagram representing an example of a cellular communication system demonstrating a possible scenario for configuring a terminal, according to the present invention.

The present invention provides a "plug and play" methodology for configuring a terminal (equivalently called user equipment, UE, mobile station, MS, mobile phone or mobile device), which is enabled for handling data-protocol services (e.g. GRPS), for data-protocol services specific to a service provider so as to be able to connect said terminal to an IP backbone network via a network, which provides said data-protocol (e.g. GRPS) services and which is provided by said service provider, according to the present invention. The present invention further consists of using a well-known access point node (APN) name, and a well-known (common, generic) uniform resource locator (URL) string (request), to access a service provider specific help-portal server of the network to request a provisioning of the terminal for configuring said terminal, which is provided by said network. A core part of the invention is the fact that the security of the provisioning download is ensured by means of a chain of trust that originates with a trusted home location register (HLR), and is built using a trusted APN, the well-known URL string and a trusted domain name service (DNS). Moreover, said security is further reinforced by authentication of the terminal by said network. Another pivotal point of the present invention is the capability to load a configuration document using e.g. HTTP, while offering security and reliability thanks to the trust model.

The present invention can use either a dedicated logical APN name, or it can use a wildcard (undefined) APN name that is mapped in the network to a dedicated APN. However, it is noted that though the invention benefits from a dedicated and trusted APN, it is not dependent on such an APN. Any generic APN and generic DNS can be used at the expense of a reduction in security and trust.

The present invention allows to produce mobile devices with a common set of limited number of factory configured parameters (for example two parameters), so that these mobile devices can be distributed all over the world and will always be able to load the data services configuration of the service provider who provides service to the user. From a business concept perspective it also leverages the concept that "restricted data-protocol (e.g. GPRS) access is more important than service provider specific settings".

The invention contains the following components (or their combinations) and advances:

- Using a GPRS data connection to configure subsequent GPRS data connections and associated services. The initial GPRS data connection typically has very limited service access, and its main purpose is to act as a configuration transport. However, it may also be used for services where the transport is free of charge.
- Making it possible to dynamically configure GPRS enabled phones with service provider specific data services even if the phones at a point of manufacturing (or a point of sale) do not have any service provider specific settings.
- Making it possible for the end user to dynamically and in an interactive and user friendly way activate, order and purchase data services (including basic network access).
- Using a trust chain that originates (as pointed out above) with the home location register (HLR) defined for the particular global system for mobile communications (GSM) subscriber identity module (SIM) card and subscriber (user or end user). This trust chain is leveraged to deliver a trusted provisioning message to the terminal.
- A business concept that gives every subscriber in the network a default GPRS access, but restricts this access to a limited number of domains (for example identified by GPRS access point nodes).
- Using the restricted GPRS access to order (trigger) a provisioning of the terminal.
- Performing the provisioning either by means of a short message service (SMS), a well-known method, or by means of downloading over an IP bearer (according to the present invention), for example, using a hyper text transfer protocol (HTTP) or hyper text transfer protocol secure (HTTPS).
- Retrieving provisioning documents (e.g. open mobile alliance (OMA) client provisioning) by means of HTTP (or HTTPS, or equivalent) and by leveraging the chain of trust originated in the trusted APN (founded on the trust in the HLR). The HLR assigns a physical access point (or the APN) to the terminal, assuming the used logical APN name has trusted properties and further assuming that the APN, and anything provided through it will also be trusted. Thus, the DNS server address provided by the APN can be trusted, as well as a domain name to IP address mappings it performs. Subsequently, content retrieved from the particular URL with an explicit trust association can be trusted as well. Thus any content retrieved through the trusted APN using the trusted DNS server has a higher than normal trust level.
- Configuring terminal by using management session secured by the chain of trust described herein:
  - Using one or more commonly known logical APN names that are shared by multiple service providers;
  - Using one or more commonly known logical URL addresses that are shared by multiple service providers;
  - Assigning of trusted properties to a certain logical APN name;
  - Retrieving provisioning documents (e.g. OMA Client Provisioning) by means of HTTP (or HTTPS, or equivalent).
- Authenticating of provisioning (configuration messages) by means of a token (e.g. a PIN) issued by the terminal (client). The token is associated with the client request to the server at a point in time when the client is able to trust the server (to which it is issued, e.g., a HTTP GET or POST). The token must be associated with the configuration object, or any other object that the server provides to the client.
- Using at least two logical Access Point Nodes (APN), where one of the access points offers very limited service access, and the end user (or user) can be allowed to use it without any charge (neither subscription fee nor usage fee). The second access point offers a regular service access and is typically associated with a transport medium cost.

One simple practical scenario for implementing the present invention is described below as follows:

- The phone launches the browser and attempts to access the GPRS network by a "long press on the '0' key";
- The phone is totally un-configured, and is able to get access to all GPRS data services;
- The phone asks the network for a wildcard (logical) APN;
- The HLR (and further through the SGSN) points the device to a suitable physical APN, based on the subscription profile of the end user;
- The physical APN provides the phone with a DNS server, which makes it possible to get any URL (WEB page) that is allowed by the access control profile of the subscriber;
- The physical APN is able to provide a dedicated WEB page (Captive Portal) to the user as a response to the first HTTP GET performed by the user on an opened GPRS connection;
- This default page is a help-portal for a "free GPRS subscriber";
- The help-portal allows the user to order "Full GPRS" and to configure the terminal.

However, not all GPRS deployments will support all the assumptions made in the above scenario. Therefore the user has to assume a least common denominator of the network technology, which means that:

- The phone does not request a wildcard APN, but rather the well-known logical APN name;
- The phone does request a well-known homepage (start page) when the browser starts in un-configured mode.
- The APN is not assumed to have dynamic profile capabilities, but different APNs are requested and used with "Normal GPRS subscriber" and "Free GPRS subscriber".

The methodology of the present invention relies on a security model that can be summarized as follows:

- Terminal knows and trusts its HLR as a point of absolute trust;
- Terminal trusts that the HLR will give a trusted APN upon request;
- The HLR knows that the client wants a trusted APN by means of the well known name the client asks for;
- Terminal trusts the DNS server defined by the trusted APN (which is defined by the trusted HLR);
- The device trusts that the DNS server will convert the request for a well-known URL string to a trusted location (and service).

The chain of trust described above needs to be unbroken in order to provide a genuinely secure configuration and activation service.

FIG. 1 is a block diagram representing one example of a cellular communication system 11 demonstrating one possible scenario among others of configuring in a secure way a terminal 10, which is enabled for handling data-protocol services (e.g. GRPS), for said data-protocol services (e.g. GRPS) specific to a service provider so as to be able to connect said terminal 10 to an IP backbone network via a network 16, which provides said data-protocol (e.g. GRPS) services to the terminal 10 and which is provided by said service provider, according to the present invention.

The process starts with sending an access-request signal 30 to the network 16 by the terminal 10 for connecting to a help-portal server 24 of said network 16 and for requesting a provisioning signal 38 for configuring the terminal 10. It can be the case that the data-protocol service (e.g. GRPS) enabling parameters (a generic or well-known APN name and a generic or well-known help-portal URL) are configured into the terminal 10. Typically, said access-request signal 30 contains user identification information, a generic uniform resource locator (URL) request (it is also called "a well-known URL string", e.g. www.Help-Portal.com) for the help-portal server 24, and optionally a well-known access point node (APN) name (if it is available to the terminal 10) for accessing a trusted APN 20 or a wildcard APN as described herein. Basically the access-request signal 30 can be divided into three phases as disclosed below.

A browser user agent 12 of the terminal 10 is used in this example for sending the access-request signal 30. The browser user agent 12 is launched by a starting signal 31 from a user 14. The starting process typically includes a phone starting signal applied by the device 10, for example, to a Configuration Manager (not shown in FIG. 1) of the terminal 10. The starting process may also be manual where the user 14 selects a "unit help" (or similar command) from a menu of the device. The user identification information in the access-request signal 30 can include mobile network code (MNC), device type, device management capability, etc. The Configuration Manager can request the wildcard APN, if the terminal does not know the well-known APN name, or the Configuration Manager can optionally request said well-known APN name for accessing a trusted access point node (APN) 20 of the network 16. The trusted access point node APN 20 is identified to the terminal 10 by a trusted home location register (HLR) 18 of the network 16.

After the trusted APN 20 is identified to the terminal 10, the terminal 10 forwards the request (access-request signal 30) to the trusted APN 20, which identifies a trusted domain name service (DNS) server 22 of the network 16. The terminal 10 gets the address of the trusted DNS server 22 from the trusted APN 20 and forwards the request (access-request signal 30) to the trusted DNS server 22 to identify address mapping for the help-portal server (e.g., WEB server) 24 of the network 16 based on the URL allowed by the access control profile of the terminal 10.

The DNS servers are in a key position when it comes to routing of a universal URL (configured into every phone and every configuration manager) to a particular network (service provider) specific WEB server, which offers a context-aware help-portal. The trusted DNS server 22 replies to the terminal 10 with the address mapping which is used by the terminal 10 to identify the help-portal server 24, which can be a WEB server or any other server (e.g., HTTP is not a requirement), based on a URL allowed by an access control profile of the terminal 10 (a well-known URL string is contained in the access-request signal 30 as described above) and the terminal 10 resends the access-request signal 30 to the help-portal server 24 with the request to provide the provisioning signal 38 to the terminal 10. It is noted that in general, protocols used for communication between the terminal 10 and the help-portal server 24 can be in a public domain or can be proprietary.

Basically the access-request signal 30, as stated above, can be divided into three phases: 1) the client (terminal 10) connects to the trusted APN 20 using the HLR as a name resolution tool; 2) the client (terminal 10) gets the address of the trusted DNS server 22 from the APN 20 and uses the DNS server to resolve the mapping from a well-known URL to an IP address (of the help-portal server 24); and 3) the client (terminal 10) sends a command (e.g. an HTTP request) to the help-portal server 24 for providing provisioning signal 38. The propagation of the access-request signal 30 from the HLR 18 through the APN 20 and further through the DNS 22 to the help-portal server 24 is shown by arrows with dotted lines to demonstrate a logical flow of information whereas the actual procedure involves a continuous exchange of the information with the terminal 10 as described above.

Before providing said provisioning signal 38, the authentication process takes place. The security of configuring the terminal 10 from a terminal 10 point of view is ensured by means of a chain of trust built using the trusted HLR 18 (or trusted visitor location register (VLR) if access point roaming is permitted), the well-known APN for accessing the trusted access point node 20, the trusted DNS server 22 and the well-known URL string.

The next step is to authenticate the terminal 10 from the network 16 point of view. The authentication mechanism may rely on a pure network authentication (based on MSISDN), and/or may use a send-SMS-to-client/reply-SMS-by-user mechanism to make the authentication procedure stronger. In most systems the gateway GPRS support node (GGSN) is aware of the mapping between the IP address and the MSISDN or international mobile user identity (IMSI). This is typically communicated to an AAA server (the server program which handles user requests for access to computer resources and for an enterprise, provides authentication, authorization and accounting (AAA) services) by means of a Radius protocol. Associated with this Radius (AAA) server there is typically a database that keeps track of an active IP-address to MSISDN mappings. Thus the help-portal server 24 (or its proxy) must query this database in order to authenticate the use terminal 10. This is one possible scenario among others for implementation of an authentication block 26 of the network 16 shown in FIG. 1.

The authenticity of the terminal 10 from the network point of view is ensured in the example of FIG. 1, according to the present invention, by the verification process executed by the help-portal server 24. A user authentication request signals 32a and/or 32b are sent to the authentication block 26 of the network 16 and/or to the terminal 10 by the help-portal server 24, which receives back an authentication confirmation signals 34a and/or 34b from the authentication block 26 and/or from the terminal 10, respectively. The determination if the user is authentic is made by the help-portal server 24 based on the authentication confirmation signals 34a and/or 34b, respectively.

If it is determined that the terminal 10 is authentic, the help-portal server 24 sends a triggering signal 36 to a provisioning server 28, and then a provisioning signal 38 is sent by the provisioning server 28 to the terminal 10 thus configuring said terminal 10. In one embodiment of the present invention the provisioning signal 38 is sent by means of a short message service (SMS), a well-known method. In a second embodiment of the present invention the provisioning signal 38 is sent by means of download over an IP bearer for example using a hyper text transfer protocol (HTTP) or a hyper text transfer protocol secure (HTTPS) over the air (OTA).

FIG. 1 represents one possible scenario of demonstrating a first phase of configuring a terminal 10, according to the present invention. But there are many variations. For example, the network 16 can be configured having at least two different APNs (access points). E.g., the first APN named "InitAccess-APN" (that is the name the browser user agent block 12 will request) can provide the terminal 10 with a DNS server address when the terminal 10 connects to the network 16. However, the DNS associated with InitAccess-APN can provide only restricted access to a limited IP network, and thus to a limited set of services. The other APN, the Internet APN (or a similar APN that provides default data services) can be a default service APN providing the user with a regular network access for a multitude of services.

Figure 2:
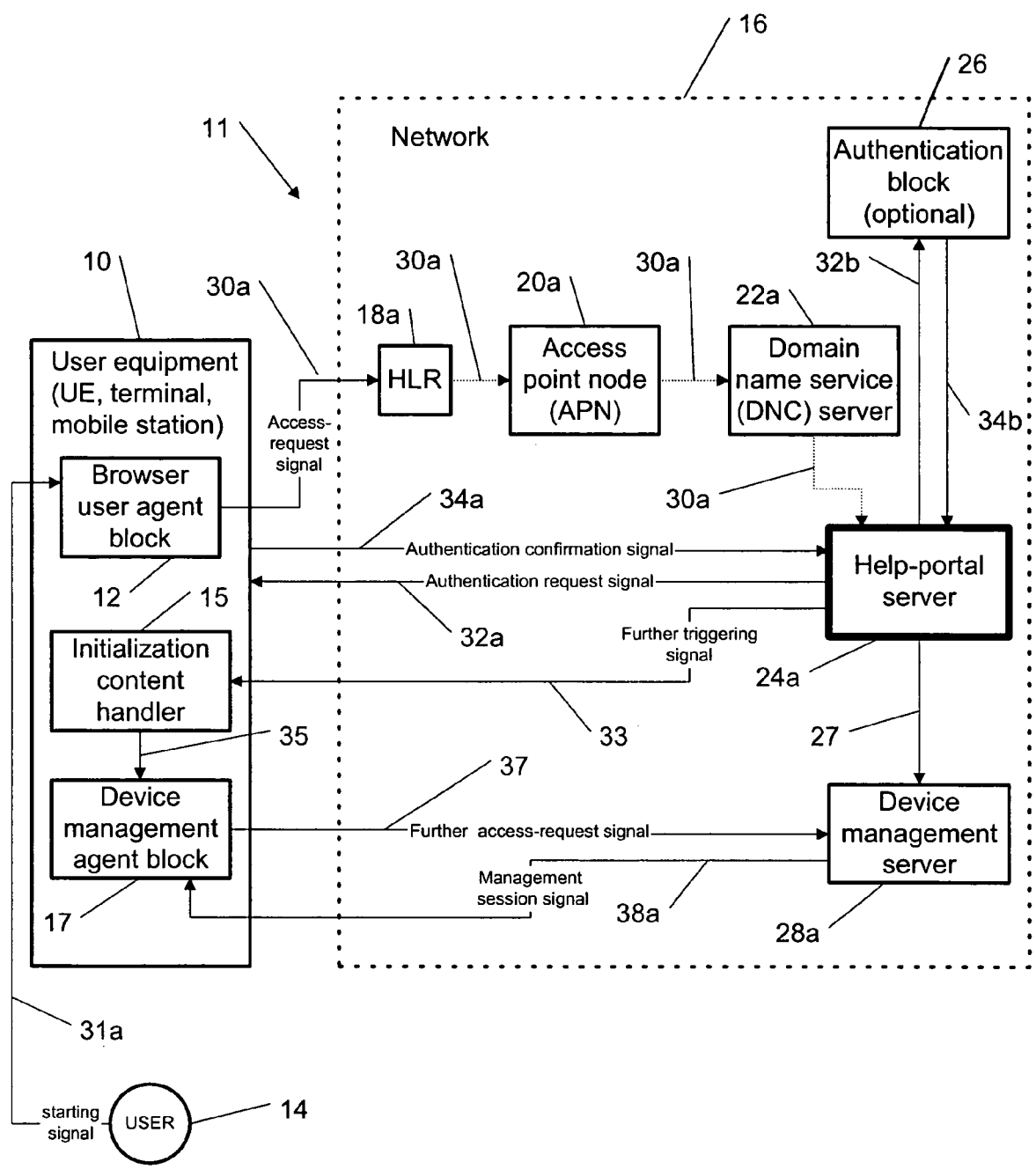
FIG. 2 is a block diagram representing an example of a cellular communication system demonstrating a further possible scenario for configuring a terminal, according to the present invention.

FIG. 2 is a block diagram representing another example of a cellular communication system 11 demonstrating a further possible scenario among others for configuring in a secure way a terminal 10, which is enabled for handling data-protocol services (e.g. GRPS), for data-protocol services specific to a service provider so as to be able to connect said terminal 10 to an IP backbone network via a network 16, which provides said data-protocol (e.g. GRPS) services to the terminal 10 and which is provided by said service provider, according to the present invention.

The deployment for the example of FIG. 2 is very similar to the example of of FIG. 1 with the exception that the terminal 10 is either configured with an additional URL for a device management server access, or the URL for the Device management Server is delivered from the help-portal server 24a by some means for provisioning. The URL of this request, for example, can be the same for all phones www.devMan-Portal.com. The process in FIG. 2 again as in FIG. 1 starts with sending an access-request signal 30a to the network 16 by the terminal 10 for connecting to a help-portal server 24a (e.g. www.help-portal.com) of said network 16 and for requesting a management session signal 38a for further configuring the terminal 10. Typically, said access-request signal 30a contains similar information as the signal 30 of FIG. 1 (e.g., the user identification information, a well-known APN name for accessing a trusted APN or the wildcard APN), but also a further generic uniform resource locator (URL) request (it is also called "a further well-known URL string", e.g. www.devMan-Portal.com) for a device management server 28a. A browser user agent 12 of the terminal 10 is used (as in the example of FIG. 1) for sending the access-request signal 30a.

The starting process (e.g., launching signal 31a) is the same as for the example of FIG. 1 (signal 31). The procedure of "propagation" of the access-request signal 30a from the HLR 18a through the APN 20a and further through the DNS 22a to the help-portal server 24a is also the same as described regarding "propagation" of the signal 30 from the HLR 18 through the APN 20 and further through the DNS 22 to the help-portal server 24 in FIG. 1. The trusted HLR 18a, the trusted APN 20a, the trusted DNS server 22a and the help-portal server 24a in the example of FIG. 2 typically can be the same as the HLR 18, the APN 20, the DNS 22 and the help-portal server 24, respectively, in the example of FIG. 1.

The security provision for configuring the terminal 10 from the user 14 point of view in the example of FIG. 2 is identical to the example of FIG. 1, and the authentication of the terminal 10 from the network 16 point of view is ensured in the example of FIG. 2, according to the present invention, by the help-portal server 24a the same way as it was executed by the help-portal server 24 in the example of FIG. 1.

If it is determined that the terminal 10 is authentic, the help-portal server 24a sends an initial provisioning triggering signal 27 to a device management server 28a for initial provisioning and sends a further triggering signal 33 to an initialization content handler 15 of the terminal 10. The further triggering signal 33 typically contains a proxy address and a password for connecting the terminal 10 to the device management server 28a. The further triggering signal 33 can contain an instruction for making a connection to the device management server 28a by the terminal 10. If that is the case, the initialization content handler block 15 sends a start signal 35 to a device management agent block 17 of the terminal 10. Then the device management agent block 17 sends a further access-request signal 37 containing a network access authentication to the device development server 28a followed by the device development server 28a sending a management session signal 38a to the device development server 28a for configuring said terminal 10. Said management session signal 38a can use e.g. OMA SyncML DM protocol which represents another embodiment (the third embodiment) by which the terminal 10 can be configured.

Figure 3:
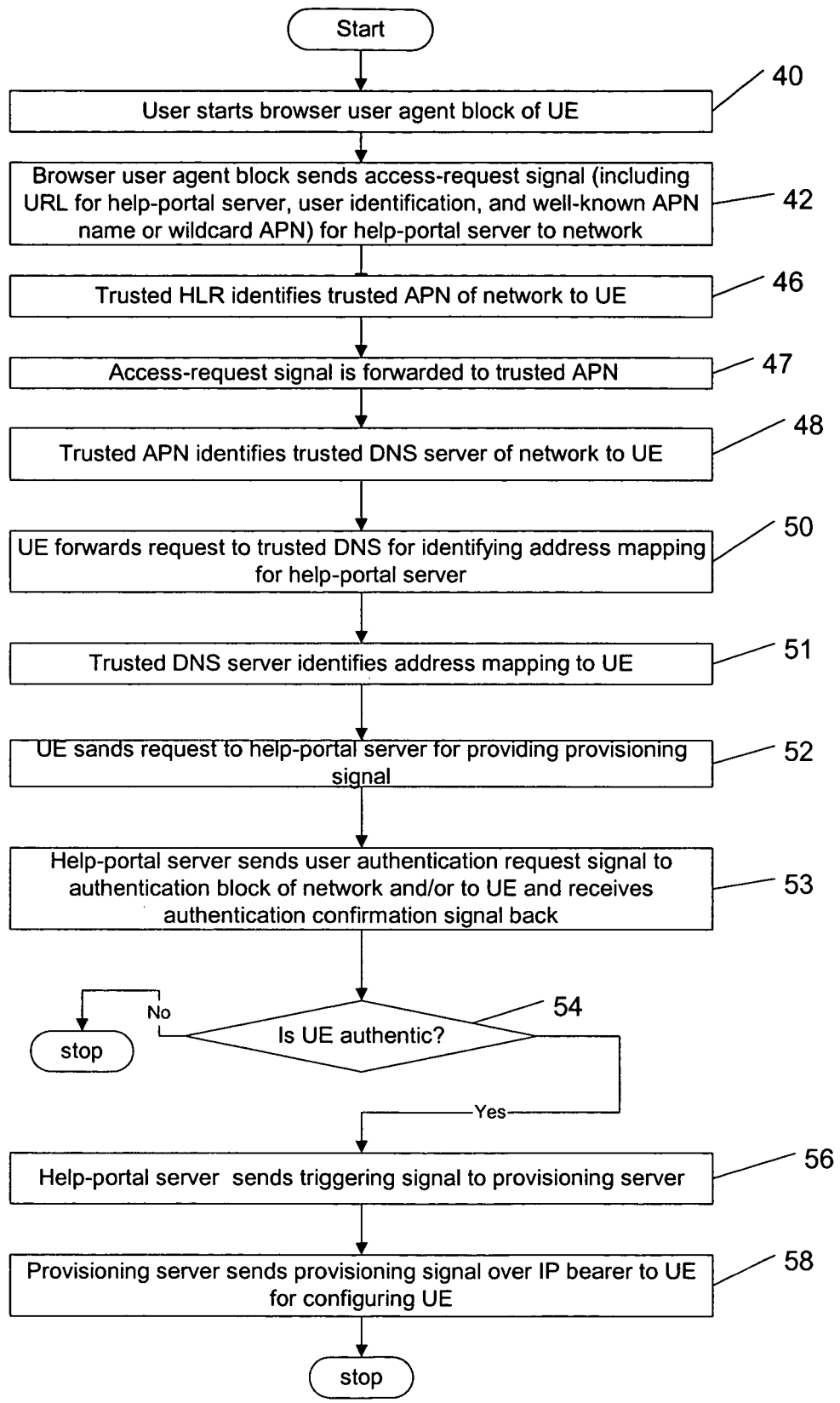
FIG. 3 is a flow chart illustrating a performance of a cellular communication system demonstrating a possible scenario for configuring a terminal, according to the present invention.

FIG. 3 is a flow chart illustrating a performance of a cellular communication system 11 corresponding to the example of FIG. 1 demonstrating a possible scenario for configuring in a secure way a terminal 10, which is enabled of handling data-protocol services (e.g. GRPS), for the data-protocol services specific to a service provider so as to be able to connect said terminal 10 to an IP backbone network via a network 16, which provides said data-protocol services (e.g. GRPS) to the terminal 10 and which is provided by said service provider, according to the present invention.

The flow chart of FIG. 3 only represents one possible scenario among many others. In a method according to the present invention, in a first step 40, the user 14 starts the browser user agent block 12 of the terminal 10 by sending the starting signal 31. In a next step 42, the browser user agent block 12 sends the access-request signal 30 (typically containing the well-known URL string for the help-portal server 24, user identification, and the well-known APN name or a wildcard APN as described above) to the network 16 for connecting to the help-portal server 24 of said network 16 and for requesting the provisioning signal 38 for configuring the terminal 10.

In a next step 46, the trusted HLR 18 identifies the trusted APN 20 of the network 16 to the terminal 10. In a next step 47, the access-request signal 30 is forwarded to the trusted APN 20 by the terminal 10.

In a next step 48, the trusted APN 20 identifies the trusted DNS server 22 of the network 16 to the terminal 10. In a next step 50, the terminal 10 forwards the request (access-request signal 30) to the trusted DNS server 22 to identify address mapping for the help-portal server (WEB server) 24 of the network 16 based on the URL allowed by the access control profile of the terminal 10. In a next step 51, the DNS server 22 identifies said address mapping to the terminal 10. In a next step 52, the terminal 10 sends the request (resending the access-request signal 30) to the identified help-portal server 24 for providing the provisioning signal 38 to the terminal 10.

In a next step 53, the help-portal server 24 sends the user authentication request signals 32a and/or 32b to the authentication block 26 of the network 16 and/or to the terminal 10 and receives back the authentication confirmation signals 34a and/or 34b from the authentication block 26 and/or from the terminal 10, respectively.

In a next step 54, it is ascertained by the help-portal server 24, based on the authentication confirmation signals 34a and/or 34b, whether the terminal 10 is authentic. As long as that is not the case, the process stops. However, if it is ascertained that the terminal 10 is authentic, in a next step 56, the help-portal server 24 sends a triggering signal 36 to a provisioning server 28. Finally, in a next step 58, the provisioning server 28 sends a provisioning signal 38 to the terminal 10 thus configuring said terminal 10. The provisioning signal 38 is sent either by means of a short message service (SMS), a well-known method, or by means of download over an IP bearer (according to the present invention), for example, using the HTTP over the air (OTA).

Figure 4:
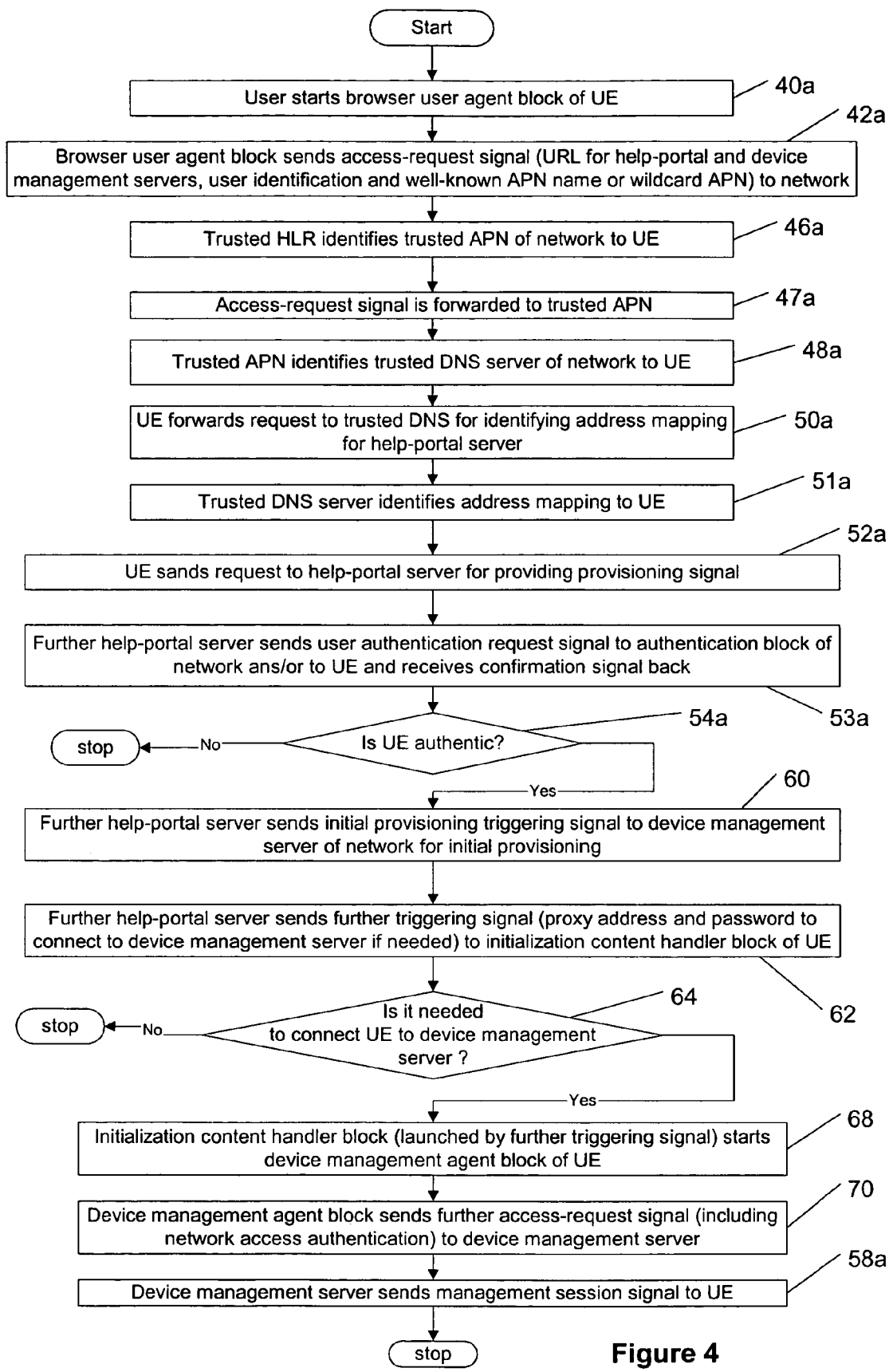
FIG. 4 is an illustration of a performance of a cellular communication system demonstrating a further possible scenario for configuring a terminal, according to the present invention.

FIG. 4 is a flow chart illustrating a performance of a cellular communication system 11 corresponding to the example of FIG. 2 demonstrating a further possible scenario for configuring in a secure way a terminal 10, which is enabled for handling data-protocol services (e.g. GRPS), for data-protocol services specific to a service provider so as to be able to connect said terminal 10 to an IP backbone network via a network 16, which provides said data-protocol services (e.g. GRPS) to the terminal 10 and which is provided by said service provider, according to the present invention.

The flow chart of FIG. 4 only represents one possible scenario among many others. In a method according to the present invention, in a first step 40a, the user 14 starts the browser user agent block 12 of the terminal 10 by sending the starting signal 31a. In a next step 42a, the browser user agent block 12 sends the access-request signal 30a (typically containing the well-known URL string for the help-portal server 24 and for the device management server 28a, the user identification, and the well-known APN name or a wildcard APN as described above) to the network 16 for connecting to the help-portal server 24a of said network 16 and for requesting the management session signal 38a for configuring the terminal 10.

In a next step 46a, the trusted HLR 18a identifies the trusted APN 20a of the network 16 to the terminal 10. In a next step 47a, the access-request signal 30a is forwarded to the trusted APN 20a by the terminal 10.

In a next step 48a, the trusted APN 20a identifies the trusted DNS server 22a of the network 16a to the terminal 10. In a next step 50a, the terminal 10 forwards the request (access-request signal 30a) to the trusted DNS server 22a to identify address mapping for the help-portal server (WEB server) 24a of the network 16 based on the URL allowed by the access control profile of the terminal 10. In a next step 51a, the DNS server 22a identifies said address mapping to the terminal 10. In a next step 52a, the terminal 10 sends the request to (re-sending the access-request signal 30) to the identified help-portal server 24a for providing the management session signal 38 to the terminal 10.

In a next step 53a, the help-portal server 24a sends the user authentication request signals 32a and/or 32b to the authentication block 26 of the network 16 and/or to the terminal 10 and receives back an the authentication confirmation signals 34a and/or 34b from the authentication block 26 and/or from the terminal 10, respectively.

In a next step 54a, it is ascertained by the help-portal server 24a, based on the authentication confirmation signals 34a and/or 34b, whether the terminal 10 is authentic. As long as that is not the case, the process stops. However, if it is ascertained that the terminal 10 is authentic, in a next step 60, the help-portal server 24a sends the initial provisioning triggering signal 27 to the device management server 28a for the initial provisioning. In a next step 62, the help-portal server 24a sends the further triggering signal 33 to the initialization content handler 15 of the terminal 10. The further triggering signal 33 typically contains the proxy address and the password for connecting the terminal 10 to the device management server 28a. The further triggering signal 33 can contain the instruction for making the connection to the device management server 28a by the terminal 10.

In a next step 64, it is ascertained by the initialization content handler 15 whether it is needed to continue the process and connect the terminal 10 to the device management server, i.e. whether there is the instruction in the further triggering signal 33 for making the connection to the device management server 28a. As long as that is not the case, the process stops. However, if it is ascertained that there is the instruction in the further triggering signal 33 for making the connection to the device management server 28a, in a next step 68, the initialization content handler block 15 sends the start signal 35 to the device management agent block 17 of the terminal 10. In a next step 70, the a device management agent block 17 sends the further access-request signal 37 containing the network access authentication to the device development server 28a. Finally, in a next step 58a, the device development server 28a sends the management session signal 38a to the device development server 28a for configuring of said terminal 10.

As explained above, the invention provides both a method and corresponding equipment consisting of various modules providing the functionality for performing the steps of the method. The modules may be implemented as hardware, or may be implemented as software or firmware for execution by a processor. In particular, in the case of firmware or software, the invention can be provided as a computer program product including a computer readable storage structure embodying computer program code, i.e. the software or firmware thereon for execution by a computer processor (e.g., provided with the terminal 10 and/or by the network 16).

What is claimed is:

1. A method, comprising:
    sending an access-request signal comprising a well-known uniform resource locator to a network by a terminal for connecting to a help-portal server of said network and for requesting a provisioning signal or a management session signal for configuring the terminal;
    receiving by the terminal, in response to said sending the access-request signal, an identity of said help-portal server using a chain of trust comprising at least two consecutive exchanges of information between trusted elements of the network and the terminal; and
    re-sending, in response to said receiving said identity of said help-portal server, said access-request signal to the help-portal server by the terminal with a request to provide the provisioning signal or the management session signal to the terminal, wherein, after being configured using the provisioning signal or the management session signal, the terminal is enabled for handling data-protocol services and dynamically configured for the data-protocol services specific to a service provider in a secure way based on said chain of trust so as to be able to connect said terminal to an IP backbone network via said network, which provides said data-protocol services and which is provided by said service provider wherein identifying said help-portal server comprises:
    identifying to the terminal a trusted access point node name by a trusted home location register of the network;
    re-sending the access-request signal to the trusted access point node by the terminal;
    identifying to the terminal a trusted domain name service server of the network by the trusted access point node;

re-sending said access-request signal by the terminal to the trusted domain name service server for identifying an address mapping for the help-portal server; and identifying said address mapping to the terminal by the trusted domain name service server.

2. The method of claim 1, wherein said data-protocol services specific to said service provider are provided by a general packet radio service.

3. The method of claim 1, wherein the access-request signal is sent by a browser user agent block of the terminal.

4. The method of claim 1, wherein the well-known uniform resource locator is allowed by an access control profile of the terminal.

5. The method of claim 1, further comprising:
sending the provisioning signal or the management session signal to the terminal for configuring the terminal.

6. The method of claim 5, wherein the provisioning signal is sent over an IP bearer or sent using a short message service protocol.

7. The method of claim 6, wherein said provisioning signal is sent over the IP bearer using a hyper text transfer protocol or a hyper text transfer protocol secure.

8. The method of claim 6, wherein said provisioning signal is sent over air.

9. The method as in claim 1, wherein a security of configuring the terminal is ensured by means of the chain of trust built by the trusted home location register, by a well-known access point node name for accessing the trusted access point node, by the trusted access point node, by the trusted domain name service sewer and by the well-known uniform resource locator.

10. The method of claim 1, wherein after said sending the request signal to the help-portal sewer, the method fun her comprises:
sending a user authentication request signal to an authentication block of the network or to the terminal or to both, the authentication block and the terminal, respectively, by the help-portal sewer, and receiving authentication confirmation signal back from the authentication block or from the terminal, respectively, or from both, the authentication block and the terminal; and
determining if the terminal is authentic by the help-portal server based on the authentication confirmation signals.

11. The method of claim 1, wherein said access-request signal contains user identification information, a generic uniform resource locator request for the help-portal server or for the help-portal server and a device management server, and a well-known access point node name for accessing the trusted access point node or a wildcard access point node.

12. The method of claim 10, wherein if it is determined that the terminal is authentic, the method further comprises:
sending a triggering signal to a provisioning sewer by the help-portal server; and
sending the provisioning signal by the provisioning server to the terminal and so configuring said terminal.

13. The method of claim 10, wherein if it is determined that the terminal is authentic, the method further comprises the:
sending an initial provisioning triggering signal to a device management server for initial provisioning; and
sending a further triggering signal by the help-portal server to an initialization content handler of the terminal, said further triggering signal containing a proxy address and a password for connecting to the device management server.

14. The method of claim 13, further comprising:
determining if the further triggering signal contains an instruction of making a connection to the device management server by the terminal.

15. The method of claim 14, wherein if the further triggering signal contains the instruction for making the connection to the device management server by the terminal, the method further comprises:
sending a start signal to a device management agent block of the terminal by an initialization content handler block;
sending a further access-request signal containing a network access authentication to the device management server by the device management agent block; and
sending the management session signal by the device management server to the terminal for further configuring the terminal.

16. The method of claim 1, wherein before sending the access-request signal to the network, the method further comprises:
starting a browser user agent by a starting signal.

17. A cellular communication system, comprising:
a processor
a terminal, enabled for handling data-protocol services and dynamically configured for the data-protocol services specific to a service provider in a secure way based on a chain of trust, responsive to a provisioning signal or to a management session signal for configuring the terminal, for sending an access-request signal comprising a well-known uniform resource locator for connecting to a help-portal server, for re-sending, in response to identifying said help-portal server,
said access-request signal to the help-portal server with a request to provide the provisioning signal or the management session signal to the terminal; and
a network provided by said service provider and comprising said help-portal server, responsive to the access-request signal, for providing the data-protocol services specific to the service provider, for said identifying, in response to said sending the access-request signal, said help-portal server to said terminal using said chain of trust comprising at least two consecutive exchanges of information between trusted elements of the network and the terminal, for providing the provisioning signal or the management session signal to the terminal to perform said configuring and for enabling after said configuring a connection of said terminal to an IP backbone network via the network, wherein said help-portal server of said network is responsive to the access-request signal and to one or both authentication confirmation signals, for providing a triggering signal, or an initial provisioning triggering signal and a further triggering signal; said network further comprises:
a trusted domain name service server, responsive to the re-sending of the access-request signal from the terminal based on an identification of the trusted domain name service server provided by a trusted access point node, for identifying to the terminal an address mapping for the help-portal server;
the trusted access point node, responsive to the re-sending of the access-request signal based on an identification of the trusted access point node provided by a trusted home location register, for providing to the terminal the trusted domain name service server;
the trusted home location register, responsive to the access-request signal, for providing the trusted access point node to the terminal; and optionally an authentication block, responsive to an authentication request signal, for providing the one authentication confirmation signal to the help-portal server.

18. The cellular communication system of claim 17, wherein the well-known uniform resource locator is allowed by an access control profile of the terminal.

19. The cellular communication system of claim 17, wherein said data-protocol services specific to said service provider are provided by a general packet radio service.

20. The cellular communication system of claim 17, wherein the terminal comprises:
a browser user agent block, responsive to a starting signal, for providing the access-request signal to the network.

21. The cellular communication system of claim 17, wherein a security of configuring the terminal is ensured by means of the chain of trust built by the trusted home location register, by a well-known access point node name for accessing the trusted access point node, and further built by the trusted access point node, by the trusted domain name service server and by the well-known uniform resource locator.

22. The cellular communication system of claim 17, wherein said access-request signal contains user identification information, a generic uniform resource locator request for the help-portal server or for the help-portal server and a device management server, and a well-known access point node name for accessing the trusted access point node or a wildcard access point node.

23. The cellular communication system of claim 17, wherein the network further comprises:
a provisioning server, responsive to the triggering signal by the help-portal server, for providing the provisioning signal to the terminal.

24. The cellular communication system of claim 17, wherein the network further comprises:
a device management server, responsive to said initial provisioning triggering signal, to a further access-request signal containing a network access authentication provided by the terminal in response to said further triggering signal, for providing the management session signal to the terminal for configuring the terminal.

25. The cellular communication system of claim 24, wherein the terminal further comprises:
an initialization content handler, responsive to the further triggering signal containing a proxy address and a password for connecting to the device management server, for providing a start signal; and
a device management agent block, responsive to the start signal, for providing the further access-request signal.

26. The cellular communication system of claim 17, wherein the provisioning signal is sent over an IP bearer or sent using a short message service protocol.

27. The cellular communication system of claim 26, wherein said provisioning signal is sent over the IP bearer using a hyper text transfer protocol or a hyper text transfer protocol secure.

28. The cellular communication system of claim 26, wherein said provisioning signal is sent over air.

29. A terminal apparatus, comprising:
a processor;
a browser user agent block, for sending an access-request signal comprising a well-known uniform resource locator to a network for connecting to a help-portal server of said network, for re-sending, in response to identifying said help-portal server, said access-request signal to the help-portal server with a request to provide a provisioning signal or a management session signal to the terminal apparatus, wherein said terminal apparatus is configured to receive an identity of said help-portal server using a chain of trust comprising at least two consecutive exchanges of information between trusted elements of the network and the browser user agent block, wherein said trusted elements of the network comprise a trusted home location register, a trusted access point node, and a trusted domain name service server, and wherein, after being configured using the provisioning signal or the management session signal, the terminal apparatus is enabled for handling data-protocol services and dynamically configured for the data-protocol services specific to a service provider in a secure way based on said chain of trust so as to be able to connect said terminal to an IP backbone network via the network, which is configured to provide said data-protocol services and which is provided by said service provider, wherein security of configuring the terminal apparatus is ensured by the chain of trust built by the trusted home location register, by a well-known access point node name provided by the trusted home location register to the terminal apparatus, and further built by the trusted access point node identifying to the terminal apparatus the trusted domain name service server in response to the re-sending of the access-request signal based on an identification of the trusted access point node provided by the trusted home location register and by the trusted domain name service server providing an address mapping to the terminal apparatus for locating the help-portal server in response to the re-sending of the access-request signal based on an identification of the trusted domain name service server provided by the trusted access point node.

30. The terminal apparatus of claim 29, wherein said data-protocol services specific to said service provider are provided by a general packet radio service.

31. A network, comprising:
a processor;
a help-portal server, for providing data-protocol services specific to a service provider, responsive to re-sending of an access-request signal from a terminal for providing a provisioning signal or a management session signal to the terminal to perform dynamic configuring of said terminal for the data-protocol services specific to the service provider in a secure way based on a chain of trust so as to enable after said configuring a connection of said terminal to an IP backbone network via the network, which is configured to provide said data-protocol services and which is provided by said service provider, wherein the re-sending of the access-request signal is in response to said terminal sending said access-request signal comprising a well-known uniform resource locator for connecting to said help-portal server of said network, the network is configured to identify said help-portal server to said terminal using said chain of trust comprising at least two consecutive exchanges of information between trusted elements of the network and the terminal, wherein said trusted elements of the network comprise:
a trusted home location register, responsive to the access-request signal, for providing a trusted access point node to the terminal,
the trusted access point node, responsive to the re-sending of the access-request signal based on an identification of the trusted access point node provided by the trusted home location register, for providing to the terminal a trusted domain name service server;

the trusted domain name service server, responsive to the re-sending of the access-request signal from the terminal based on an identification of the trusted domain name service server provided by the trusted access point node, for identifying to the terminal an address mapping for the help-portal server.

32. The network of claim 31, wherein the help-portal server is configured to provide an authentication request signal, and said network further comprises:
an authentication block, responsive to said authentication request signal, for providing an authentication confirmation signal to the help-portal server.

33. The network of claim 31, wherein the help-portal server is configured to provide a triggering signal in response to said access-request signal, and said network comprises:
a provisioning server, responsive to the triggering signal by the help-portal server, for providing the provisioning signal to the terminal.

34. The terminal apparatus of claim 29, wherein the security of configuring the terminal apparatus is ensured by means of the chain of trust built by the trusted home location register, by the well-known access point node name for accessing the trusted access point node, and further built by the trusted access point node, by the trusted domain name service server and by the well-known uniform resource locator.

35. The network of claim 31, wherein a security of configuring the terminal is ensured by means of the chain of trust built by the trusted home location register, by a well-known access point node name for accessing the trusted access point node, and further built by the trusted access point node, by the trusted domain name service server and by the well-known uniform resource locator.

* * * * *

UNITED STATES PATENT AND TRADEMARK OFFICE
CERTIFICATE OF CORRECTION

PATENT NO. : 7,644,163 B2 Page 1 of 1
APPLICATION NO. : 10/757560
DATED : January 5, 2010
INVENTOR(S) : Patrik Gustafsson It is certified that error appears in the above-identified patent and that said Letters Patent is hereby corrected as shown below:

In column 15, line 30 (claim 9, line 6) "sewer" should be --server--.

In column 15, line 33 (claim 10, line 2) "sewer" should be --server--.

In column 15, line 33 (claim 10, line 2) "fun her" should be --further--.

In column 15, line 38 (claim 10, line 7) "sewer" should be --server--.

In column 15, line 52 (claim 12, line 3) "sewer" should be --server--.

In column 16, line 23 (claim 17, line 2) after "processor" --;-- should be inserted.

Signed and Sealed this

Twentieth Day of April, 2010

David J. Kappos
*Director of the United States Patent and Trademark Office*